July 7, 1931. E. W. DUNBAR 1,813,150
MOLDING DIE
Original Filed March 17, 1926
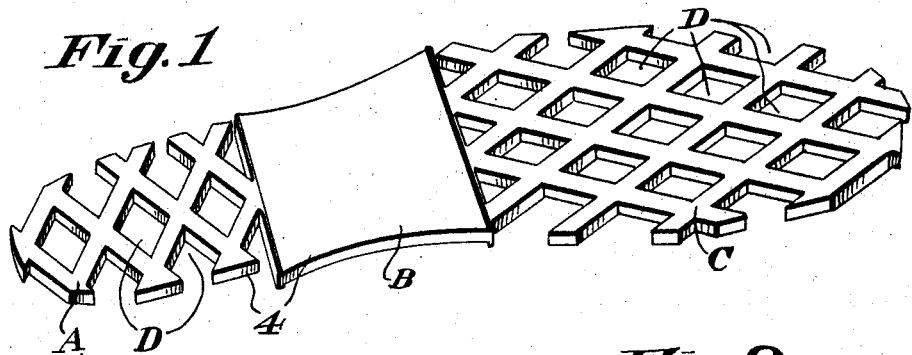
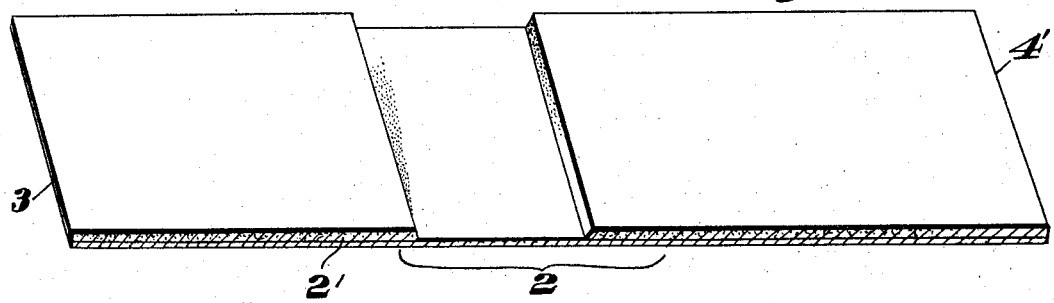
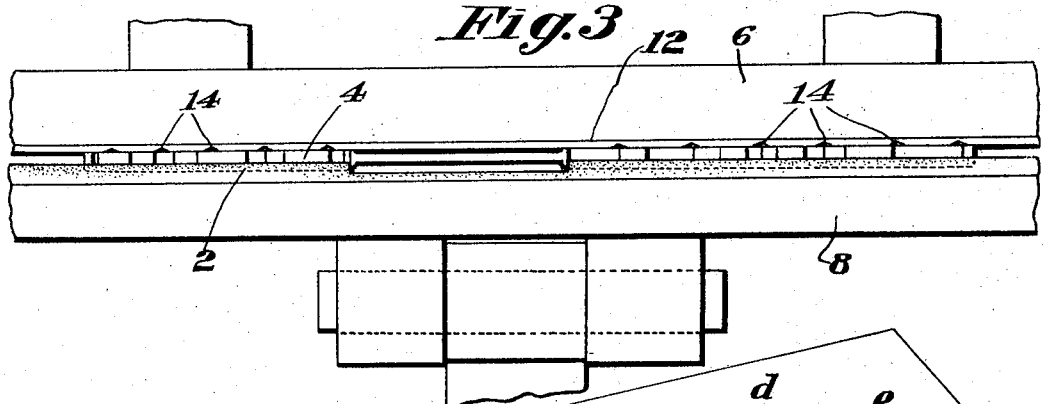
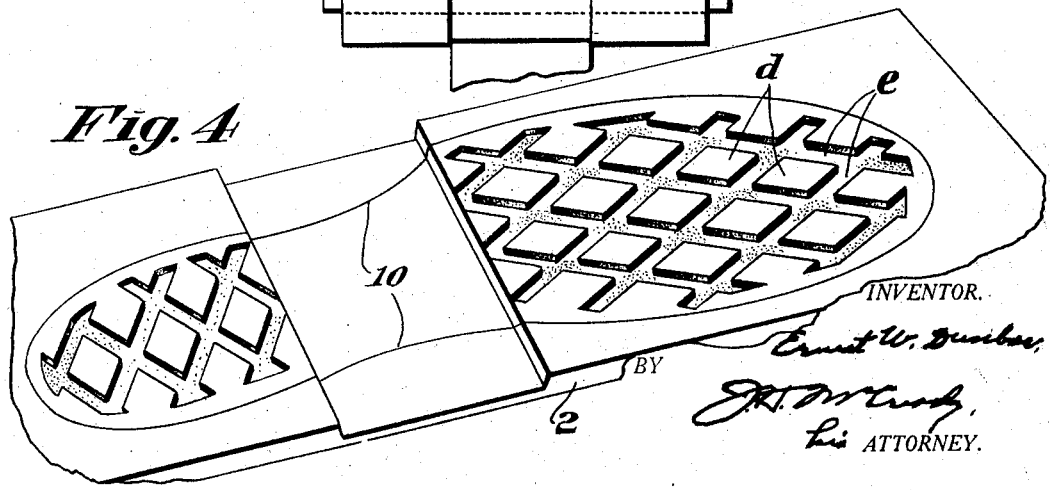
INVENTOR.
Ernest W. Dunbar,
BY
his ATTORNEY.

Patented July 7, 1931

1,813,150

UNITED STATES PATENT OFFICE

ERNEST W. DUNBAR, OF HUDSON, MASSACHUSETTS, ASSIGNOR TO CAMBRIDGE RUBBER CO., OF CAMBRIDGE, MASSACHUSETTS, A CORPORATION OF MASSACHUSETTS

MOLDING DIE

Original application filed March 17, 1926, Serial No. 95,264. Divided and this application filed March 12, 1928. Serial No. 260,881.

This invention relates to the manufacture of outsoles for footwear molded from rubber or other plastic material. The present application is a division of my copending application Serial No. 95,264, filed March 17, 1926.

In my application above identified I disclosed a process of making molded outsoles from rubber or the like which effects a substantial saving in the production of articles of this character. The present application involves a molding die which is particularly useful in the process disclosed in said application although capable of use in other relationships, and which can be manufactured more economically than prior constructions of dies of which I have been able to learn.

The nature of the invention will be readily understood from the following description when read in connection with the accompanying drawings, and the novel features will be particularly pointed out in the appended claims.

Referring to the accompanying drawings, Figure 1 is a perspective view of a die constructed in accordance with this invention;

Fig. 2 is a perspective view of a piece of outsole stock prepared for the action thereon of said die;

Fig. 3 is a side view showing one step in the process of making an outsole with the die shown in Fig. 1; and Fig. 4 is a perspective view showing the stock or blank after it has been shaped or molded by the die.

Referring more particularly to Fig. 1, it will be observed that the die 4 there shown comprises a plate-like body having the general outline of a whole sole including a heel part A, shank B, and forepart C. It should be understood, however, that the invention is equally applicable to a die designed to be used in making a half or three-quarter sole. The die may be made from a plate of suitable metal such as brass or steel, or it may be made by casting, the particular method of manufacture depending largely on the nature of the design. Holes D are formed through both the forepart and heel part, the holes shown being of diamond shape, although any other design can be substituted for it. The opposite faces of the die are substantially alike, one being the reverse of the other, so that the same die can be used in molding right and left soles. Due to the nature of the design and the sole shaped outline of the die, some of the diamond shaped elements are not complete and form slots which extend inwardly into the body of the die from its edge.

A die of this character can be made very economically and the fact that the same die can be used in molding both right and left slots is an important practical advantage.

According to one method of using the die a sheet 2 of unvulcanized rubber stock is built up in plies, as shown in Fig. 2, this sheet comprising a lower ply 2' with additional plies 3 and 4' secured to the opposite margins thereof. A suitable section of such a sheet is placed on the movable table 8 of a press, the die 4 is superposed on it, as shown in Fig. 3, and the plate then is moved upwardly by suitable mechanism to carry the die against the fixed head 6 of the machine and press the die deeply into the stock. If desired the stock or die, or both, may be heated prior to this operation. The pressure is maintained on the stock during a brief period of dwell and then the table 8 is lowered. During the pressure period the stock is forced into the apertures and the slots in the die and is shaped by them, thus producing the prominent projections $d$ shown in Fig. 4. The bars which separate the slots and apertures produce the deep grooves $e$, Fig. 4. In order to avoid the trapping of air in the cavities or apertures in the die while it is being pressed into the stock, the die may be backed up by a plate having transverse grooves 14, Fig. 3, formed in it.

After the pressing or molding operation has been completed the stock is removed from the die, and in order to prevent the rebound or tendency of the stock to return to its original condition it may be plunged into cold water either before or after it is separated from the die. The blank then is trimmed to the sole-shaped outline 10, Fig. 4, after which it may be applied to the bottom of a shoe, the sole being vulcanized during the vulcanizing of the shoe.

While I have herein shown and described a die of a typical construction, it will be understood that the invention may be embodied in forms of dies other than that shown without departing from the spirit or scope thereof.

Having thus described my invention, what I desire to claim as new is:

1. A die for molding outsoles from rubber and the like comprising a plate-like body of approximately sole-shaped outline having faces on opposite sides thereof for molding right and left soles, respectively, and having holes extending through said body from one face thereof to the other to produce prominent features of the desired design in the same relationship to the outlines of both right and left soles.

2. A die for molding outsoles from rubber and the like comprising a plate-like body of approximately sole-shaped outline having faces on opposite sides thereof for molding right and left soles, respectively, and having holes extending through said body from one face thereof to the other and also having slots extending into said body from the edge thereof, said slots and holes being adapted to produce prominent features of the desired design in the same relationship to the outlines of both right and left soles.

3. A die for molding outsoles from rubber and the like comprising a plate-like body of approximately sole-shaped outline having faces on opposite sides thereof for molding right and left soles, respectively, and having deep cavities in opposite sides thereof to mold prominent features of the desired design in substantially the same relationship to the outlines of both right and left soles.

In testimony whereof I have signed my name to this specification.

ERNEST W. DUNBAR.